US009472336B2

(12) United States Patent
Jung

(10) Patent No.: US 9,472,336 B2
(45) Date of Patent: Oct. 18, 2016

(54) POWER TRANSMITTING COIL AND WIRELESS POWER TRANSMITTING APPARATUS

(71) Applicant: Hanrim Postech Co., Ltd., Suwon-si, Gyeonggi-do (KR)

(72) Inventor: Chun-Kil Jung, Seoul (KR)

(73) Assignee: HANRIM POSTECH CO., LTD., Suwon-si (KR)

( * ) Notice: Subject to any disclaimer, the term of this patent is extended or adjusted under 35 U.S.C. 154(b) by 833 days.

(21) Appl. No.: 13/675,632

(22) Filed: Nov. 13, 2012

(65) Prior Publication Data

US 2013/0119779 A1 May 16, 2013

(30) Foreign Application Priority Data

Nov. 10, 2011 (KR) ........................ 10-2011-0116929

(51) Int. Cl.
*H01F 38/14* (2006.01)
*H01F 27/28* (2006.01)

(52) U.S. Cl.
CPC .......... *H01F 27/2871* (2013.01); *H01F 38/14* (2013.01); *H02J 50/40* (2016.02)

(58) Field of Classification Search
None
See application file for complete search history.

(56) References Cited

U.S. PATENT DOCUMENTS 6,650,213 B1 * 11/2003 Sakurai ................ G06K 7/0008 335/296
6,934,167 B2 * 8/2005 Jang ........................ H02J 5/005 363/21.02
8,207,807 B2 * 6/2012 Kikuchi .............. H01F 27/2871 336/188

(Continued)

FOREIGN PATENT DOCUMENTS

CN 101375483 A 2/2009
CN 101919139 A 12/2010

(Continued)

OTHER PUBLICATIONS

Office Action issued by the Chinese Patent Office, dated Feb. 1, 2016 in corresponding application No. 201210444389.X.

(Continued)

*Primary Examiner* — Rexford Barnie
*Assistant Examiner* — David Shiao
(74) *Attorney, Agent, or Firm* — Stein IP, LLC

(57) ABSTRACT

Disclosed herein are a power transmitting coil used to wirelessly transmit a power and a wireless power transmitting apparatus wirelessly transmitting a power using the power transmitting coil. The power transmitting coil includes at least one first coil mounted on a central portion of a core in which, when the power transmitting coil transmits a power, a current flows in a first direction; and at least one second coil disposed at an outer side of the first coil in which, when the power transmitting coil transmits a power, a current flows in a second direction opposite to the first direction. The wireless power transmitting apparatus wirelessly transmits the power using the power transmitting coil including the first coil and the second coil.

10 Claims, 11 Drawing Sheets

(56) References Cited

U.S. PATENT DOCUMENTS

| | | | | |
|---|---|---|---|---|
| 8,338,990 | B2 * | 12/2012 | Baarman | H01F 38/14 307/104 |
| 8,508,184 | B2 * | 8/2013 | Sakakibara | B60L 5/005 180/65.1 |
| 8,587,154 | B2 * | 11/2013 | Fells | H04B 5/0037 307/104 |
| 8,810,071 | B2 * | 8/2014 | Sauerlaender | H02J 5/005 370/104 |
| 2004/0267501 | A1 * | 12/2004 | Freed | H02J 7/025 702/184 |
| 2009/0033280 | A1 | 2/2009 | Choi et al. | 320/108 |
| 2009/0096414 | A1 * | 4/2009 | Cheng | H02J 5/005 320/108 |
| 2009/0276016 | A1 * | 11/2009 | Phillips | A61N 1/3787 607/61 |
| 2010/0259217 | A1 * | 10/2010 | Baarman | H02J 5/005 320/108 |
| 2011/0140538 | A1 | 6/2011 | Jung et al. | 307/104 |
| 2011/0140653 | A1 * | 6/2011 | Jung | H02J 7/025 320/108 |
| 2011/0169337 | A1 * | 7/2011 | Kozakai | H02J 5/005 307/104 |
| 2013/0093253 | A1 * | 4/2013 | Norconk | H02J 5/005 307/104 |

FOREIGN PATENT DOCUMENTS

| | | | | |
|---|---|---|---|---|
| JP | 2005-202933 A | 7/2005 | | |
| KR | WO 2010067927 A1 * | 6/2010 | | H02J 7/025 |

OTHER PUBLICATIONS

Japanese Office Action dated Aug. 9, 2016, issued by the Japanese Office Action in corresponding application JP 2012-248725.

Chinese Office Action dated Aug. 23, 2016, issued by the Chinese Patent Office in corresponding application CN 201210444389.X.

* cited by examiner

POWER TRANSMITTING COIL AND WIRELESS POWER TRANSMITTING APPARATUS

CROSS-REFERENCE TO RELATED APPLICATIONS

This application claims the benefit of Korean Patent Application No. 10-2011-0116929, filed on Nov. 10, 2011 in the Korean Intellectual Property Office and entitled "Power Transmitting Coil and Wireless Power Transmitting Apparatus", the disclosure of which is hereby incorporated by reference in its entirety into this application.

BACKGROUND OF THE INVENTION

1. Field of the Invention

The present invention relates to a power transmitting coil used to wirelessly transmit a power and a wireless power transmitting apparatus wirelessly transmitting a power using the power transmitting coil.

2. Description of the Related Art

Generally, various portable terminals such as a cellular phone, a personal digital assistant (PDA), or the like, includes a power receiving apparatus such as a battery pack charged with a power, to supply the charged power to the portable terminal for operation of the portable terminal. The power receiving apparatus may receive a power supplied from an external charging apparatus.

The power receiving apparatus may include a battery cell module charged with the power, and a circuit for charging the power supplied from the external charging apparatus into the battery cell module and for discharging the power charged in the battery cell module into the portable terminal, among other components.

One known method of electrically connecting the charging apparatus to the power receiving apparatus is a connection between a terminal through which the power exits the charging apparatus and a terminal through which the power enters the power receiving apparatus, with or without an intermediary cable.

However, using this method, the terminal of the charging apparatus and the terminal of the power receiving apparatus may have different potential differences. Therefore, when the two terminals are connected to each other or disconnected from each other, an instantaneous discharging phenomenon can occur.

This instantaneous discharge phenomenon causes abrasion of the terminals. In addition, if foreign materials have accumulated in either terminal, said foreign materials may be exposed to heat from the instantaneous discharge phenomenon, such that there is a risk of an accident such as a fire or the like.

In addition, the power charged in the battery cell module of the power receiving apparatus naturally discharges into the environment through the terminal of the power receiving apparatus due to moisture or the like, such that a lifespan of the power receiving apparatus may decrease and performance of the power receiving apparatus may deteriorate.

Recently, a wireless power transmitting apparatus, which wirelessly transmits the power to the power receiving apparatus, has been suggested in order to solve the above-described problems of the terminal connection scheme.

The wireless power transmitting apparatus wirelessly transmits the power using, in one known method, electromagnetic induction. The power receiving apparatus receives the transmitted power and charges the received power in the battery cell module.

A number of efforts have been made to improve this system and method such that the power may be wirelessly transmitted stably and at high efficiency, such that the power receiving apparatus may receive the maximum amount of transmitted power.

In one known system, the wireless power transmitting apparatus includes a core assembly. The core assembly of the wireless power transmitting apparatus includes a core, and a power transmitting coil seated on the core.

In addition, the power receiving apparatus also includes a core assembly, and the core assembly of the power receiving apparatus includes a core and a power receiving coil seated on the core and receiving the power transmitted by the wireless power transmitting apparatus.

The power transmitting coil, included in the core assembly of the wireless power transmitting apparatus, and the power receiving coil, included in the core assembly of the power receiving apparatus, have different sizes due to characteristics thereof.

Specifically, since the power receiving coil of the power receiving apparatus should be connected to the portable terminal and provide a charging function, a size of the power receiving coil is determined according to a size of the power receiving apparatus.

In contrast, the power transmitting coil of the wireless power transmitting apparatus should be able to be mounted by the entire portable terminal in which the power receiving apparatus is located. Therefore, a size of the power transmitting coil of the wireless power transmitting apparatus should be larger than a size of the portable terminal.

Further, since the portable terminal generally has a rectangular shape, the power transmitting coil and the core included in the core assembly of the wireless power transmitting apparatus generally have oval or rectangular shapes rther than circular shapes.

However, since the power receiving apparatus of the portable terminal generally has a square shape, the power receiving coil included in the core assembly of the power receiving apparatus generally has a circular shape, and the core on which the power receiving coil is mounted also generally has a rectangular or circular shape.

The difference in the shapes and sizes of the two core assemblies, of the wireless power transmitting apparatus and the power receiving apparatus respectively, can create variance in the power received by the power receiving apparatus. That is, when the power receiving apparatus is placed on the wireless power transmitting apparatus, a power induced in the power receiving coil of the core assembly of the power receiving apparatus will vary according to a specific position at which the core assembly of the power receiving apparatus is placed relative to the core assembly of the wireless power transmitting apparatus.

The variance of the power induced in the power receiving coil also has a negative effect on communication of digital data transmitted between the wireless power transmitting apparatus and the power receiving apparatus. Therefore, a system which avoids such variance is desirable.

SUMMARY OF THE INVENTION

While not limited thereto, according to an embodiment of the present invention, a power transmitting coil may comprise at least one first coil in which, when the power transmitting coil transmits a power, a current flows in a first direction; and at least one second coil disposed at an outer side of the first coil in which, when the power transmitting coil transmits a power, a current flows in a second direction opposite to the first direction.

While not limited thereto, according to an embodiment of the present invention, a wireless power transmitting apparatus may comprise a power transmitting unit which switches a direct current (DC) power to generate an alternate current (AC) power; and a core assembly which wirelessly transmits the AC power generated by the power transmitting unit, wherein the core assembly comprises: a power transmitting coil having the AC power supplied thereto; and a core upon which the power transmitting coil is seated, the power transmitting coil comprising: at least one first coil in which, when the power transmitting coil transmits a power, a current flows in a first direction; and at least one second coil disposed at an outer side of the first coil in which, when the power transmitting coil transmits a power, a current flows in a second direction opposite to the first direction.

According to an aspect of the invention, the power transmitting unit may comprise a power transmission controlling unit which controls a power transmission of the power transmitting coil; a driving driver which generates a driving signal for the power transmission under the control of the power transmission controlling unit; and a series resonant converter which switches the DC power according to the driving signal generated by the driving driver and supplies the switched power to the power transmitting coil.

According to an aspect of the invention, the power transmitting unit may further comprise a signal transmitting unit which, under the control of the power transmission controlling unit, generates a request signal requesting information regarding a power receiving apparatus and transmits the generated request signal to the power receiving apparatus through the power transmitting coil; and a signal receiving unit which receives at least one signal from the power receiving apparatus through the power transmitting coil and provides the at least one received signal to the power transmission controlling unit.

While not limited thereto, according to an embodiment of the present invention, a wireless power transmitting apparatus may comprise a power transmitting unit which switches a DC power to generate an AC power; a core assembly comprising a power transmitting coil which wirelessly transmits the AC power generated by the power transmitting unit and a core upon which the power transmitting coil is seated; and a switching unit which links the power transmitting unit and the power transmitting coil of the core assembly and which switches the AC power under a control of the power transmitting unit, wherein the power transmitting coil comprises at least one first coil in which, when the power transmitting coil transmits a power, a current flows in a first direction; and at least one second coil disposed at an outer side of the first coil in which, when the power transmitting coil transmits a power, a current flows in a second direction opposite to the first direction, wherein the switching unit switches the AC power under the control of the power transmitting unit to selectively supply the switched power to the first coil and the second coil.

According to an aspect of the invention, the power transmitting unit may comprise a power transmission controlling unit which controls a power transmission of the power transmitting coil and a switching operation of the switching unit; a driving driver which generates a driving signal for the power transmission under the control of the power transmission controlling unit; and a series resonant converter which switches the DC power according to the driving signal generated by the driving driver and supplies the switched power to the switching unit.

According to an aspect of the invention, the power transmitting unit may further comprise a signal transmitting unit which, under the control of the power transmission controlling unit, generates a request signal requesting information on a power receiving apparatus and transmits the generated request signal to the power receiving apparatus through the power transmitting coil; and a signal receiving unit which receives at least one a signal from the power receiving apparatus through the power transmitting coil and provides the at least one received signals to the power transmission controlling unit.

According to an aspect of the invention, the series resonant converter may selectively supply the AC power to the first coil and the second coil according to a position at which a power receiving coil of a power receiving apparatus is placed on the power transmitting coil.

According to an aspect of the invention, the power transmission controlling unit may control the switching unit to selectively supply the AC power to the first coil and/or the second coil, according to a position at which a power receiving coil of a power receiving apparatus is placed on the power transmitting coil.

According to an aspect of the invention, a straight line distance between an inner peripheral surface of the first coil and an outer peripheral surface of the second coil may be larger than a diameter of a power receiving coil wirelessly receiving the power.

According to an aspect of the invention, the first coil and the second coil may be wound in directions opposite to each other.

According to an aspect of the invention, the first coil and the second coil may be consecutively wound using one wire coated with an insulating material.

According to an aspect of the invention, the first coil and the second coil may be individually wound using at least one wire coated with an insulating material and be electrically connected in series with each other by soldering an outer end portion of the first coil and an inner end portion of the second coil to each other.

According to an aspect of the invention, the first coil and the second coil may be disposed in a concentric arrangement on the same plane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
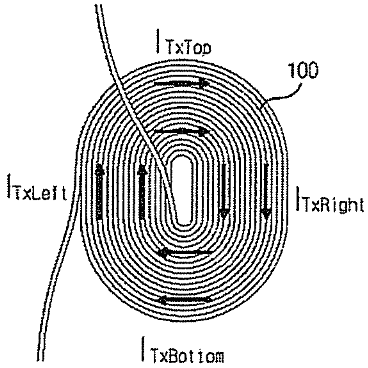
FIGS. 1A and 1B are diagrams showing a power transmission from a power transmitting coil of a core assembly of a wireless power transmitting apparatus to a power receiving coil of a core assembly of a power receiving apparatus, as exists in the related prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures, to present a principle and a concept of the present invention in a manner that most usefully and easily describes the present invention.

The following detailed description is only an example and only illustrates exemplary embodiments of the present invention. For basic understanding of the present invention, unnecessary details and additional embodiments of the present invention that may be appreciated by those skilled in the art will not be described, or illustrated in the accompanying drawings.

Figure 1B:
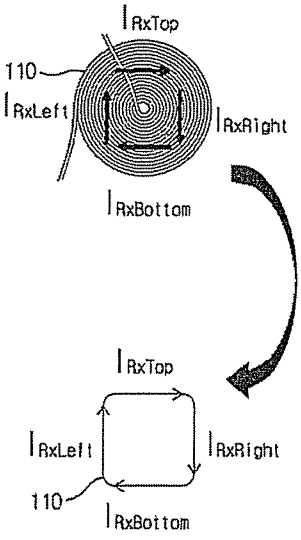

FIGS. 1A and 1B depict a power transmission from a power transmitting coil 100 of a core assembly of a wireless power transmitting apparatus to a power receiving coil 110 of a core assembly of a power receiving apparatus, as exists in related prior art.

The power transmitting coil 100 and the power receiving coil 110, which frequently in the prior art are formed by winding wires coated with an insulating material in a clockwise direction (or a counterclockwise direction), generally have different shapes. In addition, the power transmitting coil 100 generally has a significantly larger size as compared with the power receiving coil 110, due to characteristics thereof.

For example, as depicted in FIGS. 1A and 1B, the power transmitting coil 100 has an oval shape with a horizontal width of about 57 mm and a vertical width of about 70 mm, and the power receiving coil 110 has a circular shape with a diameter of an outer peripheral edge of about 32 mm.

As shown in FIG. 1A, when a power to be transmitted to the power receiving apparatus is supplied to the power transmitting coil 100, a top current $I_{TxTop}$ flows in a region at a top position, a right current $I_{TxRight}$ flows in a region at a right position, a bottom current $I_{TxBottom}$ flows in a region at a bottom position, and a left current $I_{TxLeft}$ flows in a region at a left position. Together, currents $I_{TxToP}$, $I_{TxRight}$, $I_{TxBottom}$, and $I_{TxLeft}$ flow in the power transmitting coil 100 in a first direction, depicted in FIG. 1A as a clockwise direction, such that magnetic fluxes are generated.

Further, when the power receiving coil 110 is placed on the power transmitting coil 100, the magnetic fluxes generated in the power transmitting coil 100 are interlinked with the power receiving coil 110, as shown in FIG. 1B. Thus, a top current $I_{RxTop}$ flows in a region at a top position, a right current $I_{RxRight}$ flows in a region at a right position, a bottom current $I_{RxBottom}$ flows in a region at a bottom position, and a left current $I_{RxLeft}$ flows in a region at a left position. Together, currents $I_{RxTop}$, $I_{RxRight}$, $I_{RxBottom}$, and $I_{RxLeft}$ flow in the power receiving coil 110 in the first direction of the currents in the power transmitting coil 100, depicted in FIG. 1B as a clockwise direction.

FIGS. 2A, 2B, and 2C once again depict a wireless power transmission from a power transmitting coil 100 of a core assembly of a wireless power transmitting apparatus to a power receiving coil 110 of a core assembly of a power receiving apparatus, as exists in related prior art, this time in detail according to the position of the power receiving coil 110 relative to the power transmitting coil 100.

Figure 2A:
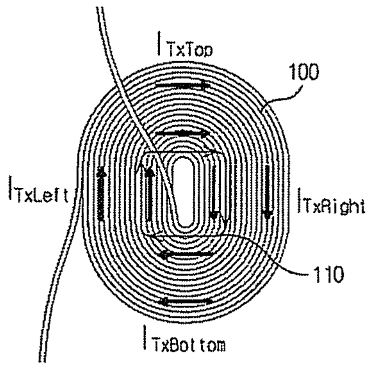
FIGS. 2A to 2C are diagrams showing a current induced and flowing in the power receiving coil according to a position at which the power receiving coil is placed on the power transmitting coil, as exists in the related prior art.

As shown in FIG. 2A, when the power receiving coil 110 is placed on a central position of the power transmitting coil 100, all of the directions of the top current $I_{TxTop}$, the right current $I_{TxRight}$, the bottom current $I_{TxBottom}$, and the left current $I_{TxLeft}$ flowing in the power transmitting coil 100 coincide with the top current $I_{RxTop}$, the right current $I_{RxRight}$, the bottom current $I_{RxBottom}$, and the left current $I_{RxLeft}$ induced and flowing in the power receiving coil 110, respectively.

Therefore, the power transmitting coil 100 and the power receiving coil 110 may be entirely linked to each other so that the magnetic field interlinkage is smoothly made, and the power receiving coil 110 may receive the power in an optimal state.

However, a user may inaccurately place the power receiving coil 110 of the power receiving apparatus, other than at the central position of the power transmitting coil 100. In addition, even when the user accurately places the power receiving coil 110 at the central position of the power transmitting coil 100, a vibration may move the portable terminal, such that the power receiving coil 110 may deviate from the central position of the power transmitting coil 100.

Figure 2B:
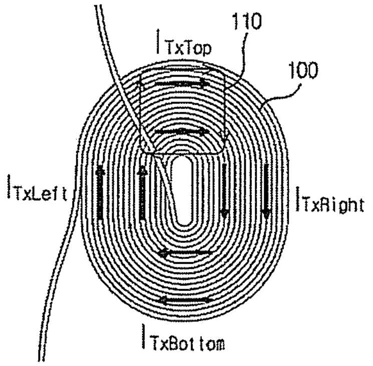

As shown in FIG. 2B, when the power receiving coil 110 is placed on a top position of the power transmitting coil 100—that is, a position at which the top current $I_{TxTop}$ flows in the power transmitting coil 100—the directions of the top current $I_{TxTop}$ flowing in the power transmitting coil 100 and the top current $I_{RxTop}$ induced and flowing in the power receiving coil 110 coincide with each other. However, the bottom current $I_{RxBottom}$ of the power receiving coil 110 also flows at the position at which the top current $I_{TxTop}$ flows in the power transmitting coil 100, but the directions of the top current $I_{TxTop}$ and the bottom current $I_{RxBottom}$ are opposite to each other.

Therefore, the power transmitting coil 100 and the power receiving coil 110 are linked to each other so that magnetic flux interlinkages of the top current $I_{TxTop}$ flowing in the power transmitting coil 100 and the bottom current $I_{RxBottom}$ flowing in the power receiving coil 110 are offset against each other, and the power induced in the power receiving coil 110 becomes relatively weaker than the power in the case shown in FIG. 2A.

Figure 2C:
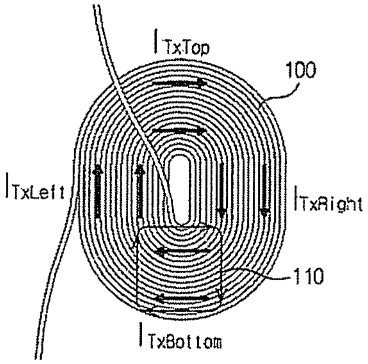

As shown in FIG. 2C, when the power receiving coil 110 is placed on a bottom position of the power transmitting coil 100—that is, a position at which the bottom current $I_{TxBottom}$ flows in the power transmitting coil 100—the directions of the bottom current $I_{TxBottom}$ flowing in the power transmitting coil 100 and the bottom current $I_{RxBottom}$ induced and flowing in the power receiving coil 110 coincide with each other. However, the top current $I_{RxTop}$ also flows in the power receiving coil 110 at the position at which the bottom current $I_{TxBottom}$ flows in the power transmitting coil 100, but the directions of the bottom current $I_{TxBottom}$ and the top current $I_{RxTop}$ become opposite to each other.

Therefore, the power transmitting coil 100 and the power receiving coil 110 are linked to each other so that so that magnetic flux interlinkages of the bottom current $I_{TxBottom}$ flowing in the power transmitting coil 100 and the top current $I_{RxTop}$ flowing in the power receiving coil 110 are offset against each other, and the power induced in the power receiving coil 110 becomes relatively weaker than the power in the case shown in FIG. 2A.

As described above, a strength of the power from the power transmitting coil 100 to the power receiving coil 110 is changed according to the position of the power receiving coil 110, such that a degree of freedom in the position at which the power receiving coil 110 is placed on the power transmitting coil 100 is significantly limited and in need of improvement.

Figure 3:
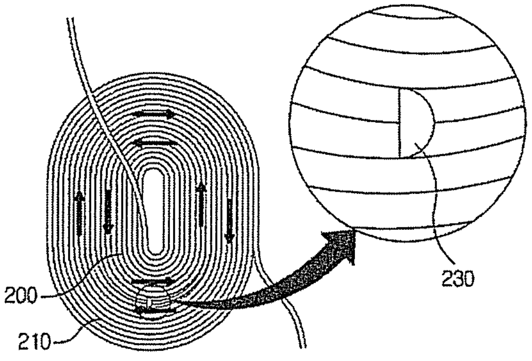
FIG. 3 is a diagram showing a configuration of a power transmitting coil, according to one embodiment of the present invention.

According to an aspect of the invention depicted in FIG. 3, a power transmitting coil comprises a first coil 200, seated on a central portion of a core (not shown). The first coil 200, which is wound in a first direction—for example, a counterclockwise direction—has a current flowing in the first direction in the case of transmitting the power.

The power transmitting coil also comprises a second coil 210 seated on the core and positioned at an outer side of the first coil 200. The second coil 210 is wound in a second direction—for example, a clockwise direction—opposite to the first direction. In addition, the second coil 210 may be connected in series with the first coil 200, as shown in a partially enlarged view of FIG. 3, and has a current flowing in the second direction opposite to the direction in which the current flows in the first coil 200 in the case of transmitting the power.

There may be several methods of manufacturing the power transmitting coil. For example, the power transmitting coil may be manufactured by consecutively winding the first coil 200 and the second coil 210 using one wire coated with an insulating material to connect the first coil 200 and the second coil 210 in series with each other. Alternatively, and as suggested by the partially enlarged view of FIG. 3, the power transmitting coil may be manufactured by individually winding the first coil 200 and the second coil 210, overturning any one of the first coils 200 and the second coil 210, and soldering 230 an outer end portion of the first coil 200 and an inner end portion of the second coil 210 to each other to connect the first coil 200 and the second coil 210 in series with each other. As yet another alternative, the power transmitting coil may be manufactured by appropriately setting a predetermined dedicated winding machine according to a work condition and performing a series of winding processes using the predetermined dedicated winding machine, or winding the first coil and winding the second coil in a changed direction. Since a specific manufacturing method of the power transmitting coil is not relevant to the intention of the present invention, a detailed description thereof will be omitted.

A straight line distance between an inner peripheral surface of the first coil 200 and an outer peripheral surface of the second coil 210 is larger than a diameter of the power receiving coil included in the power receiving apparatus.

According to this aspect of the invention, when the power transmitting coil having the above-mentioned configuration transmits the power, an alternate current (AC) power is applied to the first coil 200 and the second coil 210.

The first coil 200 has the current flowing in the first direction—for example, the counterclockwise direction—to transmit the power to the power receiving coil.

In addition, the second coil 210 has the current flowing in the second direction opposite to the first direction—for example, the clockwise direction—to transmit the power to the power receiving coil.

Figure 4A:
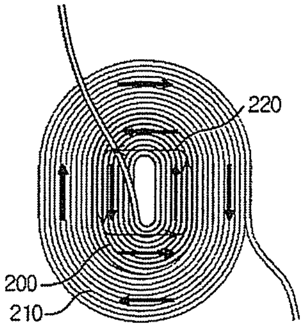
FIGS. 4A to 4C are diagrams showing a current induced and flowing in a power receiving coil according to a position at which the power receiving coil is placed on the power transmitting coil, according to one embodiment of the present invention.
Figure 4B:
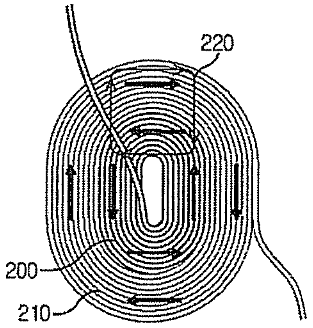
Figure 4C:
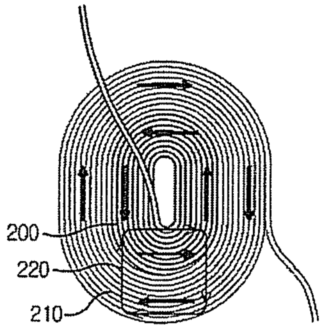

According to an aspect of the invention depicted in FIGS. 4A to 4C, a current may be induced and flowing in a power receiving coil according to a position at which the power receiving coil is placed on the power transmitting coil.

Referring to FIG. 4A, when the power receiving coil 220 is placed on the central portion of the power transmitting coil including the first coil 200 and the second coil 210, the power receiving coil 220 is positioned on the first coil 200.

In this case, all of the directions of a top current $I^{TxTop}$, a right current $I^{TxRight}$, a bottom current $I_{TxBottom}$, and a left current $I_{TxLeft}$ flowing in the first coil 200 coincide with a top current $I_{RxTop}$, a right current $I_{RxRight}$, a bottom current $I_{RxBottom}$, and a left current $I_{RxLeft}$ induced and flowing in the power receiving coil 220.

Therefore, the first coil 200 and the power receiving coil 220 may be entirely linked to each other so that magnetic field interlinkage is smoothly made, and the power receiving coil 220 may receive the power in an optimal state.

Referring to FIG. 4B, when the power receiving coil 220 is placed on the top of the power transmitting coil including the first coil 200 and the second coil 210, the bottom of the power receiving coil 220 is positioned on the top of the first coil 200, and the top of the power receiving coil 220 is positioned on the top of the second coil 210.

In this case, the direction of the top current $I_{TxTop}$ flowing in the second coil 210 coincides with the direction of the top current $I_{RxTop}$ induced and flowing in the power receiving coil 220, and the direction of the top current $I_{TxTop}$ flowing in the first coil 200 coincides with the direction of the bottom current $I_{RxBottom}$ induced and flowing in the power receiving coil 220.

Therefore, the second and first coils 210 and 200 and the power receiving coil 220 are linked to each other so that magnetic flux interlinkages of the top currents $I^{RxTop}$ each flowing in the second coil 210 and the first coil 200 coincide with the top current $I_{RxTop}$ and the bottom current $I_{RxBottom}$ of the power receiving coil 220. Therefore, the power receiving coil 220 may receive the power in an optimal state, even though the power is slightly smaller than in the case shown in FIG. 4A.

Similarly, referring to FIG. 4C, when the power receiving coil 220 is placed on the bottom of the power transmitting coil including the first coil 200 and the second coil 210, the top of the power receiving coil 220 is positioned on the bottom of the first coil 200, and the bottom of the power receiving coil 220 is positioned on the bottom of the second coil 210.

In this case, the direction of the bottom current $I_{TxBottom}$ flowing in the first coil 200 coincides with the direction of the top current $I_{RxTop}$ induced and flowing in the power receiving coil 220, and the direction of the bottom current $I_{TxBottom}$ flowing in the second coil 210 coincides with the direction of the bottom current $I_{RxBottom}$ induced and flowing in the power receiving coil 220.

Therefore, the first and second coils 200 and 210 and the power receiving coil 220 are linked to each other so that magnetic flux interlinkages of the bottom currents $I_{TxBottom}$ each flowing in the first coil 200 and the second coil 210 coincide with the top current $I_{RxTop}$ and the bottom current $I_{RxBottom}$ of the power receiving coil 220. Therefore, the power receiving coil 220 may receive the power in an optimal state, even though the power is slightly smaller than in the case shown in FIG. 4A.

In order to measure frequency response characteristics according to a change in a position at which the power receiving coil 220 is placed on the first coil 200 and the second coil 210 of the power transmitting coil, according to the above-described aspect of the present invention, a characteristic analysis experiment of a voltage gain according to a variable frequency was performed to obtain the results shown in the following Table 1. Mutual inductance was calculated using an equation $V_{Rx}$=wM$I_{Tx}$.

TABLE 1

| | Turns | | |
|---|---|---|---|
| Position of power receiving coil | Frequency (KHz) | Gain voltage (dB) | Mutual inductance (μH) |
| Top position (See FIG. 2B) | 160 | 17 | 4 |
| Central position (See FIG. 2A) | 160 | 17.5 | 4.15 |
| Bottom position (See FIG. 2C) | 160 | 17.9 | 4.19 |

Figure 5:
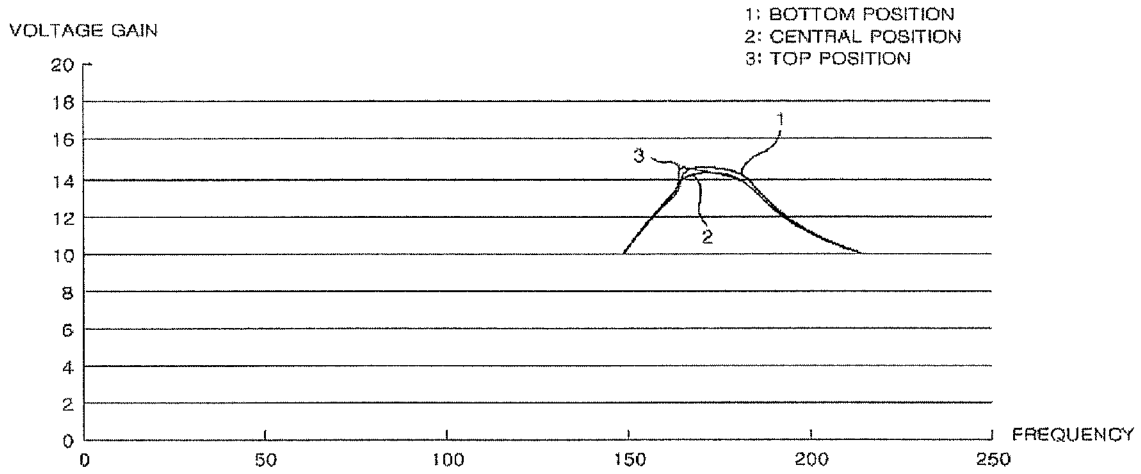
FIG. 5 is a graph showing measurements of voltage gain-frequency response characteristics according to the position at which the power receiving coil is placed on the power transmitting coil, according to one embodiment of the present invention.

In addition, the results depicted in the graph of FIG. 5 were obtained by measuring voltage gain-frequency response characteristics according to the position at which the power receiving coil 220 is placed on the first coil 200 and the second coil 210 of the power transmitting coil, according to the above-described aspect of the present invention. Here, a correspondence of resonance frequency and voltage gain was measured based on a position of the power receiving coil 220 at the top position of the power transmitting coil, as shown in FIG. 4B, the bottom position of the power transmitting coil, as shown in FIG. 4C, and the central position of the power transmitting coil, as shown in FIG. 4A.

As seen in Table 1 and FIG. 5, a change in a resonance frequency according to the position at which the power receiving coil 220 is placed on the power transmitting coil was small, and a change range of a voltage gain according to the position at which the power receiving coil 220 is placed on the power transmitting coil was 1 dB or less, which is significantly smaller than that of the power transmitting coil according to the related prior art. In addition, it will be appreciated that a change range of a mutual inductance is significantly small due to the small change range of the voltage gain.

By comparison, in the case of the related prior art as shown in FIGS. 2A to 2C, change ranges of a voltage gain and a mutual inductance according to the position at which the power receiving coil 110 is placed on the power transmitting coil 100 were significantly large as shown in the following Table 2.

TABLE 2

| | Turns | | |
|---|---|---|---|
| Position of power receiving coil | Frequency (KHz) | Gain voltage (dB) | Mutual inductance (μH) |
| Top position (See FIG. 2B) | 100 | 12.2 | 5 |
| Central position (See FIG. 2A) | 100 | 10 | 4.16 |
| Bottom position (See FIG. 2C) | 100 | 9 | 3.8 |

An aspect of the present invention in which the wireless power transmitting apparatus includes only one power transmitting coil has been described above by way of example.

Figure 6:
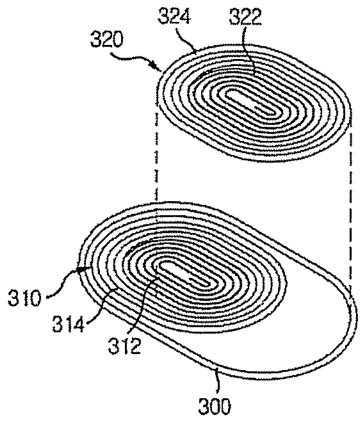
FIG. 6 is a diagram showing a configuration of a power transmitting coil, according to another embodiment of the present invention.

However, in executing the present invention, the present invention is not limited thereto. For example, in an aspect of the present invention shown in FIG. 6, a first power transmitting coil 310 and a second power transmitting coil 320 may also be provided on one core 300.

In this aspect, the first power transmitting coil 310 and the second power transmitting coil 320 may include first coils 312 and 322 wound in a first direction, and second coils 314 and 324 seated at outer sides of the first coils 312 and 322, respectively, and wound in a second direction opposite to the first direction.

Figure 7:
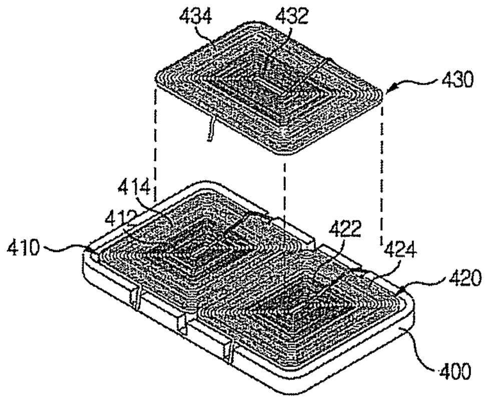
FIG. 7 is a diagram showing a configuration of a power transmitting coil, according to still another embodiment of the present invention.

Further, in an aspect of the present invention shown in FIG. 7, a first power transmitting coil 410, a second power transmitting coil 420, and a third power transmitting coil 430 may also be provided on one core 400.

In this aspect, the first power transmitting coil 410, the second power transmitting coil 420, and the third power transmitting coil 430 may include first coils 412, 422, and 432 wound in a first direction, and second coils 414, 424, and 434 seated at outer sides of the first coils 412, 422, and 432, respectively, and wound in a second direction opposite to the first direction.

Although the majority of the figures depict the first and second coils 200 and 210, 312 and 314, and 322 and 324 arranged as concentric ellipsoids on the same plane, it should be appreciated that other arrangements can be used without departing from the scope of the present invention. For instance, the aspect of the invention depicted in FIG. 7 disposes the sets of first and second coils 412 and 414, 422 and 424, and 433 and 434 in arrangements of concentric rounded rectangles. Also, although not depicted in the drawings, another aspect of the invention may dispose the first and second coils as concentric circles. It is also not a requirement of the invention that the coils be concentric or on the same plane at all. Yet other possible arrangements will be recognized by those skilled in the art.

Figure 8:
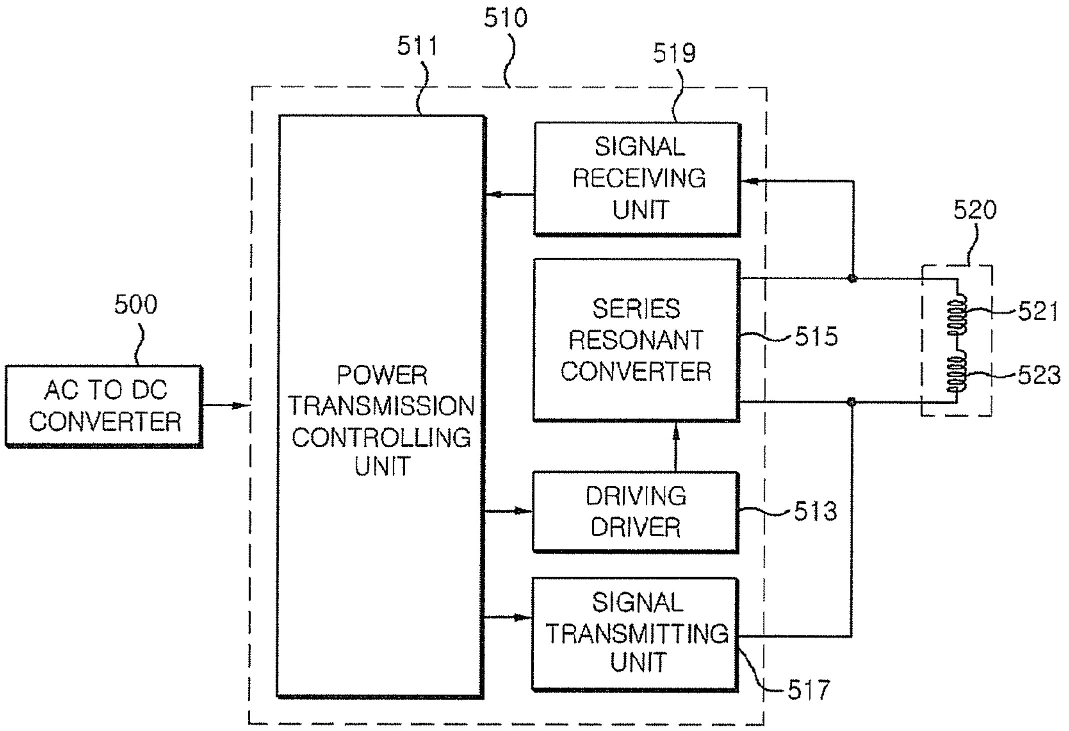
FIG. 8 is a diagram showing a configuration of a wireless power transmitting apparatus, according to one embodiment of the present invention.

FIG. 8 is a circuit diagram showing a configuration of a wireless power transmitting apparatus, according to an aspect of the present invention. Since configuration examples of circuit diagrams according to the structures of the power transmitting coils corresponding to the cases of FIGS. 3, 6 and 7, and modified examples thereof, may be easily modified and executed by those skilled in the art with reference to the following description of FIG. 8, a detailed description thereof will be omitted. Hereinafter, the wireless power transmitting apparatus of FIG. 8 using one power transmitting coil will be representatively described in order to assist in understanding the present invention.

Referring to FIG. 8, the wireless power transmitting apparatus comprises an alternate current (AC) to a direct current (DC) converter 500 converting a commercial AC power input from the outside into a DC power, a power transmitting unit 510 supplying a power to be wirelessly transmitted, and a core assembly 520 wirelessly transmitting the power.

Although FIG. 8 depicts an aspect in which the AC to DC converter 500 is provided integrally with the wireless power transmitting apparatus, according to another aspect of the present invention (not depicted), the AC to DC converter 500 may alternatively be a separate unit from the wireless power transmitting apparatus.

The power transmitting unit 510 switches the DC power converted by the AC to DC converter 500 and supplies the switched power to a first coil 521 and a second coil 523 included in the core assembly 520 to allow the power to be wirelessly transmitted.

According to the aspect of the invention depicted in FIG. 8, the power transmitting unit 510 comprises a power transmission controlling unit 511, a driving driver 513, a series resonant converter 515, a signal transmitting unit 517, and a signal receiving unit 519.

The power transmission controlling unit 511 controls the wireless transmission of the power through the first coil 521 and the second coil 523 of the core assembly 520.

The driving driver 513 generates a driving signal for transmitting the power through the first coil 521 and the second coil 523 of the core assembly 520 under the control of the power transmission controlling unit 511.

The series resonant converter 515 switches the DC power supplied by the AC to DC converter 500 according to the driving signal generated by the driving driver 513, and supplies the switched power to the first coil 521 and the second coil 523.

The signal transmitting unit 517 generates a request signal requesting information on a power receiving apparatus under the control of the power transmission controlling unit 511 and transmits the generated request signal to the power receiving apparatus through the first coil 521 and the second coil 523.

The signal receiving unit 519 receives one or more signals such as an information signal, a charging state signal, and the like, transmitted by the power receiving apparatus through the first coil 521 and the second coil 523, and provides the received signals to the power transmission controlling unit 511.

In the embodiment of the wireless power transmitting apparatus depicted in FIG. 8 transmits the power, it first judges whether or not a power receiving unit of the power receiving apparatus may receive the power. In at least one embodiment, this judgment may be based on whether or not the power receiving unit of the power receiving apparatus is positioned at a position of the core assembly 520 included in the wireless power transmitting apparatus.

To this end, the power transmission controlling unit 511 of the power transmitting unit 510 directs the driving driver 513 to generate a driving signal for detecting a change in a load.

The driving signal is generated by the driving driver 513 and provided to the series resonant converter 515.

The series resonant converter 515 selectively switches the plurality of switching devices according to the driving signal generated by the driving driver 513 to switch a DC power, thereby generating an AC power. The series resonant converter 515 may comprise a plurality of switching devices such as a plurality of transistors, a plurality of metal oxide semiconductor field effect transistors (MOSFETs), or the like; however, numerous other compositions and arrangements may be appreciated by those of skill in the art.

The AC power generated by the series resonant converter 515 is provided to the first coil 521 and the second coil 523 of the core assembly 520, and the first coil 521 and the second coil 523 are series-resonated by the AC power generated by the series resonant converter 515.

Here, the signal receiving unit 519 receives one or more signals of the first coil 521 and the second coil 523 and provides the one or more received signals to the power transmission controlling unit 511.

The power transmission controlling unit 511 receives the one or more signals of the signal receiving unit 519 and judges whether or not a change in a load has been generated in the first coil 521 and the second coil 523 of the core assembly 520 using the received one or more signals.

That is, if the power receiving unit of the power receiving apparatus does not approach the core assembly 520, a change in an impedance is not generated in the first coil 521 and the second coil 523.

In at least one embodiment, the signal receiving unit 519 may receive a frequency signal according to the driving signal generated by the driving driver 513, and the power transmission controlling unit 511 may judge, using said signal, that the change in the load has not been generated in the first coil 521 and the second coil 523.

Further, when the power receiving apparatus approaches the first coil 521 or the second coil 523 of the core assembly 520 in order to charge the power in the power receiving apparatus, the change in the impedance is generated in the first coil 521 or the second coil 523. The frequency of the signal for detecting the change in the load, applied to the first coil 521 or the second coil 523, is changed according to the change in the impedance.

Therefore, the signal receiving unit 519 receives the signal with a frequency changed according to the change in the impedance, and the power transmission controlling unit 511 judges that a change in the load has been generated in the first coil 521 or the second coil 523 using the signal of the signal receiving unit 519.

The power transmission controlling unit 511 then receives a signal of the signal receiving unit 519 and judges whether or not an ID signal of the power receiving apparatus has been received.

A change in the impedance may be generated in the first coil 521 and the second coil 523 not only when the power receiving apparatus approaches the first coil 521 or the second coil 523 as described above, but also when foreign materials other than the power receiving apparatus approach the first coil 521 or the second coil 523.

If the impedance is generated by foreign materials, then should the first coil 521 or the second coil 523 transmit a power, the power is unnecessarily consumed.

Therefore, while this operation may be excluded without departure from the scope of the present invention, in at least one embodiment, if it is judged that a change in the load has been generated in the first coil 521 or the second coil 523, the power transmission controlling unit 511 directs the signal transmitting unit 517 to generate a request signal requesting information on the power receiving apparatus—for example, an identification (ID) of the power receiving apparatus—and the generated request signal is transmitted to the power receiving apparatus through the first coil 521 or the second coil 523.

When an ID signal is received is received from the power receiving apparatus according to the request signal, the power transmission controlling unit 511 judges that the power receiving apparatus has approached the first coil 521 or the second coil 523 and controls the driving driver 513 to generate a driving signal for transmitting the power.

The switching devices of the series resonant converter 515 switch the DC power, according to the driving signal generated by the driving driver 513, to generate the AC power, and supply the generated AC power to the first coil 521 or the second coil 523, such that the power is wirelessly transmitted from the first coil 521 or the second coil 523 to the power receiving apparatus.

Here, the power transmission controlling unit 511 receives a signal of the signal receiving unit 519 to judge whether or not a charge completion signal has been received from the power receiving apparatus, and directs the driving driver 513 to end the power transmission when it is judged that the charge completion signal has been received.

An aspect of the present invention where the power transmitting coil comprises a first coil and a second coil that are connected in series with each other has been described above by way of example.

Figure 9:
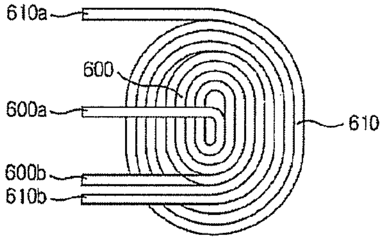
FIG. 9 is a diagram showing a configuration of a power transmitting coil, according to still another embodiment of the present invention.

However, the present invention is not limited thereto. According to another aspect of the present invention depicted in FIG. 9, the power transmitting coil may comprise a first coil 600 wound in a first direction and a second coil 610 wound in a second direction, opposite to the first direction, and may be configured so that a power to be transmitted is selectively supplied to each of the first coil 600 and the second coil 610.

It is preferable that a wireless power transmitting apparatus, according to the aspect of the present invention having the above-mentioned configuration, allows the series resonant converter 515 to selectively supply the power the first coil 600 and the second coil 610 according to the position at which the power receiving coil is placed on the power transmitting coil.

For example, when the power receiving coil is placed only on the first coil 600, the series resonant converter 515 supplies the power only to the first coil 600 to transmit the power to the power receiving apparatus.

When the power receiving coil is placed only on the second coil 610, the series resonant converter 515 supplies the power only to the second coil 610 to transmit the power to the power receiving apparatus.

When the power receiving coil is placed on both of the first coil 600 and the second coil 610, the series resonant converter 515 supplies the power to both of the first coil 600 and the second coil 610 to transmit the power to the power receiving apparatus.

Here, since detection of the position at which the power receiving coil is placed on the power transmitting coil is a general operation which will be recognized by those of skill in the art, a detailed description thereof will be omitted.

Figure 10:
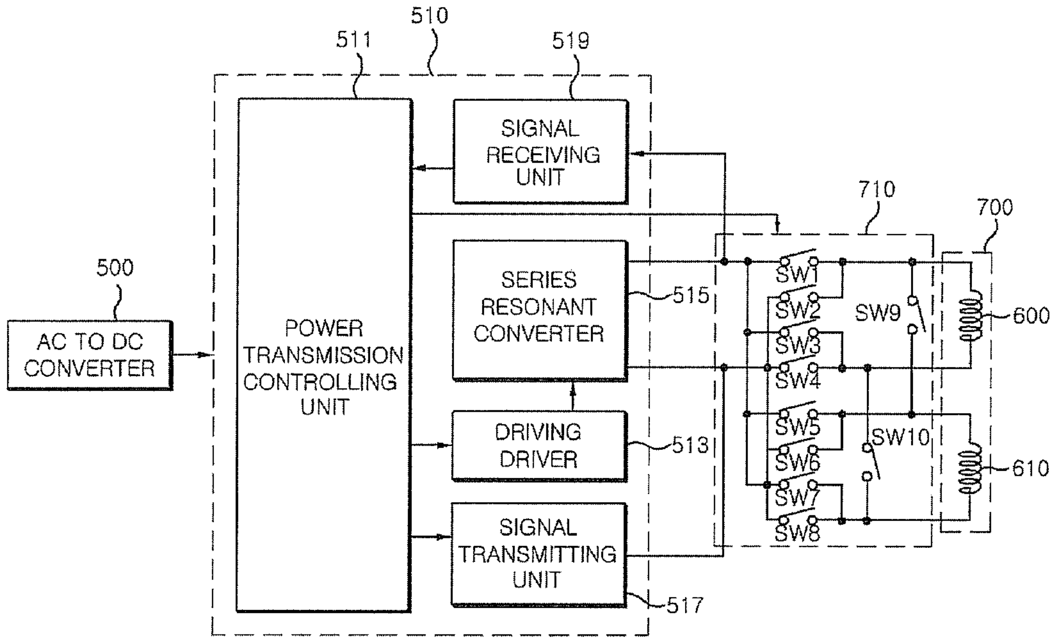
FIG. 10 is a diagram showing a configuration of a wireless power transmitting apparatus, according to another embodiment of the present invention.

According to another aspect of the invention depicted in FIG. 10, a wireless power transmitting apparatus comprises a switching unit 710 disposed between a series resonant converter 515 and comprising a plurality of switches SW1 and SW10, and a first coil 600 and a second coil 610 that are included in a core assembly 700. Each of the plurality of switches SW1 to SW10 of the switching unit 710 is switched under a control of a power transmission controlling unit 511.

The power transmission controlling unit 511 controls the switching of the plurality of switches SW1 to SW10 in order to selectively supply the power to the first coil 600 and the second coil 610, thereby making it possible to selectively adjust directions of currents flowing in the first coil 600 and the second coil 610 wirelessly transmit the power through one or both of said coils.

According to aspects of the present invention depicted in FIGS. 11A to 11D a direction in which a current flows in a first coil 600 and a second coil 610 of the power transmitting coil may be selectively changed according to a switching operation of a switching unit in the wireless power transmitting apparatus.

Figure 11A:
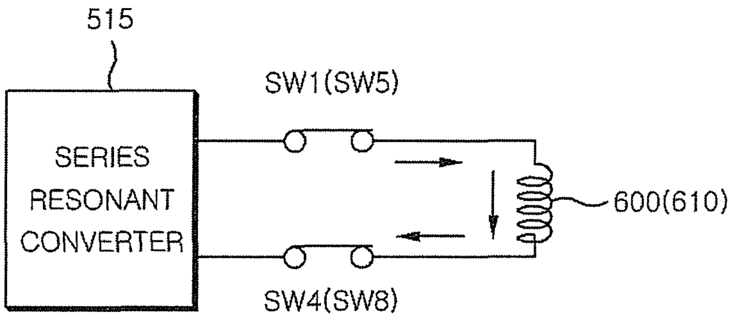
FIGS. 11A to 11D are diagrams showing a direction in which a current flows in a first coil and a second coil of the power transmitting coil according to a switching operation of a switching unit in the wireless power transmitting apparatus, according to another embodiment of the present invention.

Referring to FIG. 11A, when the power transmission controlling unit 511 directs the switching unit 710 to switch on the switches SW1 and SW4, the power is supplied only to the first coil 600, and the power may be wirelessly transmitted through the first coil 600. Further, when the switches SW5 and SW8 are switched on, the power is supplied only to the second coil 610, and the power may be wirelessly transmitted through the second coil 610.

Figure 11B:
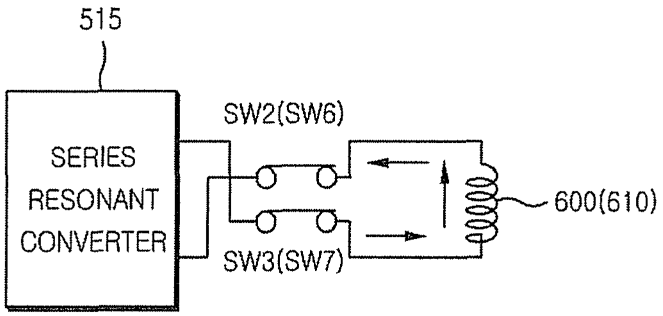

Referring to FIG. 11B, when the power transmission controlling unit 511 directs the switching unit 710 to switch on the switches SW2 and SW3, the power is supplied only to the first coil 600, and the power may be wirelessly transmitted through the first coil 600. Further, when the switches SW6 and SW7 are switched on, the power is supplied only to the second coil 610, and the power may be wirelessly transmitted through the second coil 610. In this case, the first coil 600 and the second coil 610 have a current flowing in a direction opposite to the direction in the case of FIG. 11A described above.

Figure 11C:
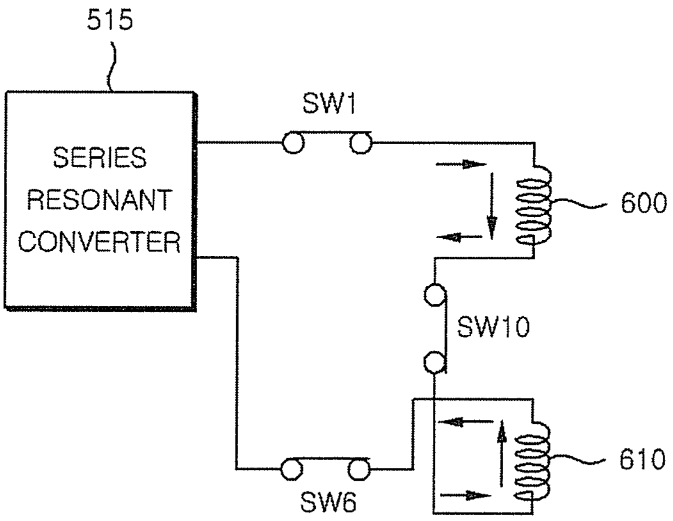

Referring to FIG. 11C, when the power transmission controlling unit 511 directs the switching unit 710 to switch on the switches SW1, SW6, and SW10, the power is supplied to both of the first coil 600 and the second coil 610, and the power may be wirelessly transmitted through both of the first coil 600 and the second coil 610. In this case, currents flow in directions opposite to each other in the first coil 600 and the second coil 610, such that magnetic fluxes are generated in directions opposite to each other.

Figure 11D:
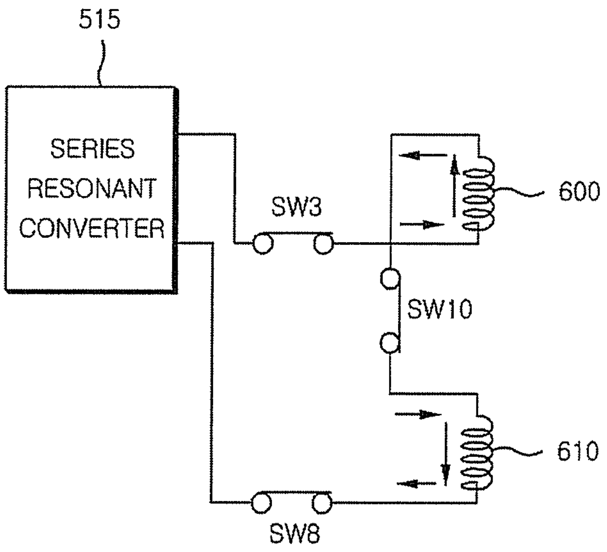

Referring to FIG. 11D, when the power transmission controlling unit 511 directs the switching unit 710 to switch on the switches SW3, SW8, and SW9, the power is supplied to both of the first coil 600 and the second coil 610, and the power may be wirelessly transmitted through both of the first coil 600 and the second coil 610. In this case, currents flow in directions opposite to each other in the first coil 600 and the second coil 610, such that magnetic fluxes are generated in directions opposite to each other.

It will be recognized by those skilled in the art that other systems of selectively supplying power to one or both coils are possible without departing from the scope of the present invention.

In summary, according to aspects of the present invention, the power transmitting coil comprises the first coil wound in the first direction and the second coil wound in the second direction opposite to the first direction, thereby making it possible to transmit the power in an optimal state regardless of a position at which the power receiving apparatus is positioned on the power transmitting coil. Therefore, a wide degree of freedom is available for a position at which the power receiving apparatus charging the power is placed.

In addition, digital data may be smoothly transmitted between the wireless power transmitting apparatus and the power receiving apparatus even when the power receiving apparatus is not placed in a central position.

Although a few embodiments of the present invention have been shown and described, those skilled in the art will appreciate that various modifications, additions and substitutions are possible, without departing from the principles and spirit of the invention, the scope of which is defined in the claims and their equivalents.

What is claimed is:

1. A wireless power transmitting coil comprising;

at least one first coil wound in a first direction in which, when the wireless power transmitting coil transmits a first power, a current of the first coil flows in the first direction; and at least one second coil wound in a second direction, opposite to the first direction, and concentrically around the first coil on the same plane and configured to contact an outer side of the first coil so that when the wireless power transmitting coil transmits a second power, a current of the second coil flows in the second direction, wherein the first coil and the second coil are planar spiral coils, wherein the first power and the second power are selectively supplied to the first coil and the second coil according to a position of a power receiving coil of a power receiving apparatus, wherein the first power and the second power are supplied to the first coil and the second coil when the power receiving coil is detected both on the first coil and the second coil, wherein the first power is supplied to the first coil only when the power receiving coil is detected on the first coil only, and wherein the second power is supplied to the second coil only when the power receiving coil is detected on the second coil only.

2. The wireless power transmitting coil of claim 1, wherein a straight line distance between an inner peripheral surface of the first coil and an outer peripheral surface of the second coil is larger than a diameter of the power receiving coil wirelessly receiving the power.

3. The wireless power transmitting coil of claim 1, wherein the first coil and the second coil are individually wound using at least one wire coated with an insulating material.

4. A wireless power transmitting apparatus comprising:

a power transmitting unit which switches a direct current (DC) power to generate an alternate current (AC) power; and a core assembly which wirelessly transmits the AC power generated by the power transmitting unit, wherein the core assembly comprises:

a power transmitting coil having the AC power supplied thereto; and a core upon which the power transmitting coil is seated, the power transmitting coil comprising:

at least one first coil wound in a first direction in which, when the power transmitting coil transmits a first power, a current of the first coil flows in the first direction; and at least one second coil wound in a second direction, opposite to the first direction, and concentrically around the first coil on the same plane and configured to contact an outer side of the first coil so that when the power transmitting coil transmits a second power, a current of the second coil flows in the second direction, wherein the first coil and the second coil are planar spiral coils, wherein the first power and the second power are selectively supplied to the first coil and the second coil according to a position of a power receiving coil of a power receiving apparatus, wherein the first power and the second power are supplied to the first coil and the second coil when the power receiving coil is detected both on the first coil and the second coil, wherein the first power is supplied to the first coil only when the power receiving coil is detected on the first coil only, and wherein the second power is supplied to the second coil only when the power receiving coil is detected on the second coil only.

5. The wireless power transmitting apparatus of claim 4, wherein the power transmitting unit comprises:

a power transmission controlling unit which controls a power transmission of the power transmitting coil;

a driving driver which generates a driving signal for the power transmission under the control of the power transmission controlling unit; and a series resonant converter which switches the DC power according to the driving signal generated by the driving driver and supplies the switched power to the power transmitting coil.

6. The wireless power transmitting apparatus of claim 5, wherein the power transmitting unit further comprises:

a signal transmitting unit which, under the control of the power transmission controlling unit, generates a request signal requesting information regarding the power receiving apparatus and transmits the generated request signal to the power receiving apparatus through the power transmitting coil; and a signal receiving unit which receives at least one signal from the power receiving apparatus through the power transmitting coil and provides the at least one received signal to the power transmission controlling unit.

7. A wireless power transmitting apparatus comprising:

a power transmitting unit which switches a DC power to generate an AC power;

a core assembly comprising a power transmitting coil which wirelessly transmits the AC power generated by the power transmitting unit, and a core upon which the power transmitting coil is seated; and at least one switching unit which links the power transmitting unit and the power transmitting coil of the core assembly and which switches the AC power, wherein the power transmitting coil comprises:

at least one first coil wound in a first direction in which, when the power transmitting coil transmits a first power, a current of the first coil flows in the first direction; and at least one second coil wound in a second direction, opposite to the first direction, and concentrically around the first coil on the same plane and configured to contact an outer side of the first coil so that when the power transmitting coil transmits a second power, a current of the second coil flows in the second direction, wherein the first coil and the second coil are planar spiral coils, wherein the switching unit switches the AC power under a control of the power transmitting unit to selectively supply the first power and the second power to the first coil and the second coil according to a position of a power receiving coil of a power receiving apparatus by the switching unit, wherein the first power and the second power are supplied to the first coil and the second coil when the power receiving coil is detected both on the first coil and the second coil, wherein the first power is supplied to the first coil only when the power receiving coil is detected on the first coil only, and wherein the second power is supplied to the second coil only when the power receiving coil is detected on the second coil only.

8. The wireless power transmitting apparatus of claim 7, wherein the power transmitting unit comprises:

a power transmission controlling unit which controls a power transmission of the power transmitting coil and a switching operation of the switching unit;

a driving driver which generates a driving signal for the power transmission under the control of the power transmission controlling unit; and a series resonant converter which switches the DC power according to the driving signal generated by the driving driver and supplies the switched power to the switching unit.

9. The wireless power transmitting apparatus of claim 8, wherein the power transmitting unit further comprises:

a signal transmitting unit which, under the control of the power transmission controlling unit, generates a request signal requesting information on the power receiving apparatus and transmits the generated request signal to the power receiving apparatus through the power transmitting coil; and a signal receiving unit which receives at least one signal from the power receiving apparatus through the power transmitting coil and provides the at least one received signals to the power transmission controlling unit.

10. The wireless power transmitting apparatus of claim 8, wherein the power transmission controlling unit controls the switching unit to selectively supply the AC power to the first coil and/or the second coil, according to the position at which the power receiving coil of the power receiving apparatus is placed on the power transmitting coil.

* * * * *